May 12, 1942.     L. T. JOHNSON ET AL     2,282,869
SHUTTER MECHANISM FOR CAMERAS
Filed Nov. 10, 1941     3 Sheets-Sheet 1

Lyle T. Johnson
Raymond A. Jensen
INVENTORS

BY Victor J. Evans & Co.
ATTORNEYS

WITNESS

May 12, 1942.  L. T. JOHNSON ET AL  2,282,869
SHUTTER MECHANISM FOR CAMERAS
Filed Nov. 10, 1941  3 Sheets-Sheet 2

Lyle T. Johnson
Raymond A. Jensen
INVENTORS

BY Victor J. Evans & Co.
ATTORNEYS

WITNESS

May 12, 1942.    L. T. JOHNSON ET AL    2,282,869
SHUTTER MECHANISM FOR CAMERAS
Filed Nov. 10, 1941    3 Sheets-Sheet 3
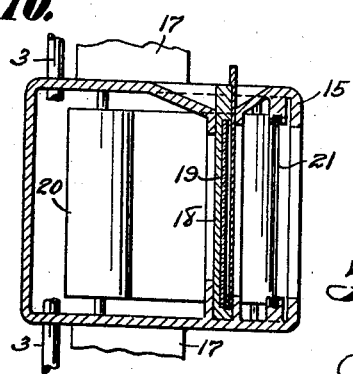
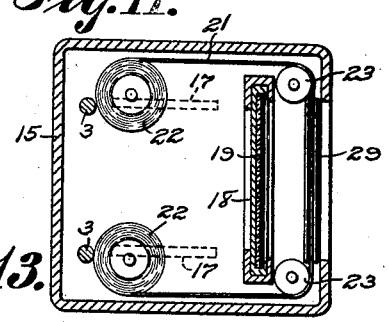
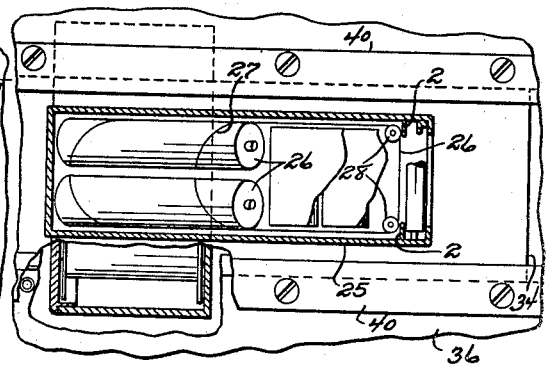
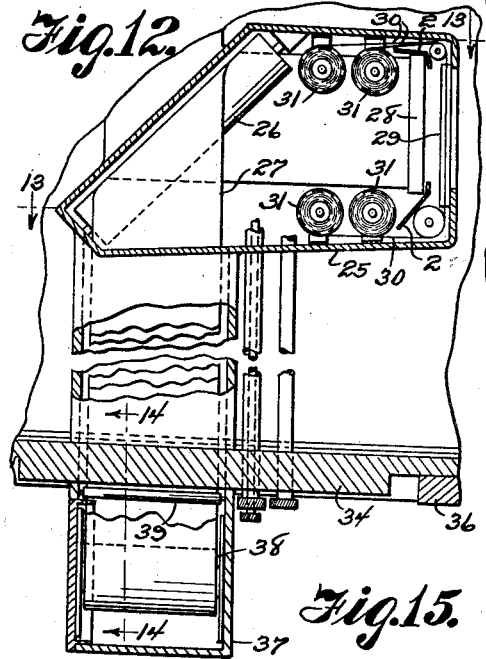
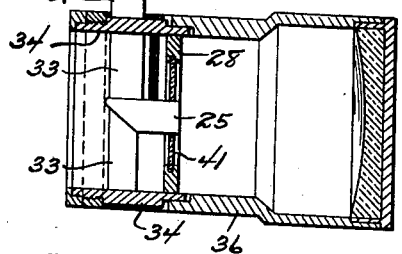
WITNESSES:
Lyle T. Johnson
Raymond A. Jensen
INVENTORS
BY
Victor J. Evans & Co.
ATTORNEYS Patented May 12, 1942

2,282,869

UNITED STATES PATENT OFFICE 2,282,869

SHUTTER MECHANISM FOR CAMERAS

Lyle T. Johnson, Madison, and Raymond A. Jensen, Menomonie, Wis.

Application November 10, 1941, Serial No. 418,564

4 Claims. (Cl. 95—31)

This invention relates to shutter mechanism for cameras and has for an object to provide a reflecting camera such as the Schmidt camera with a focal plane shutter to permit short exposures under varying light conditions.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 10 is a vertical sectional view through the plate holding box taken on the line 10—10 of Figure 3.

Figure 11 is a horizonal sectional view of the plate holding box taken on the line 11—11 of Figure 2.

Figure 12 is a detail vertical sectional view showing the reflecting type camera equipped with a box film holder instead of a box plate holder.

Figure 13 is a cross sectional view taken approximately on the line 13—13 of Figure 12.

Figure 14 is a detail cross sectional view taken on the line 14—14 of Figure 12.

Figure 15 is a vertical sectional view of the Wright reflector type camera showing the film holding box disposed in an opening in the correction lens.

Figure 1:
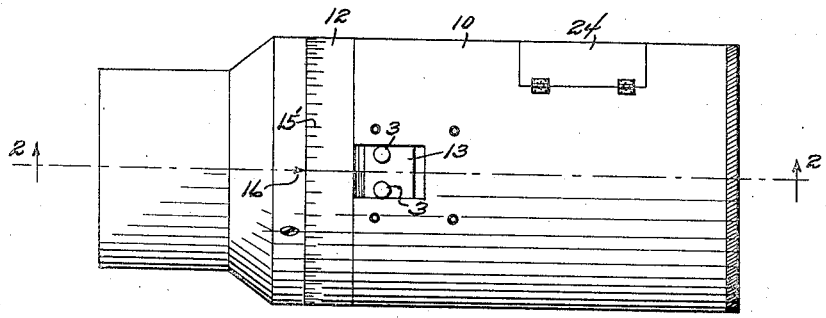
Figure 1 is a top plan view of a reflecting camera of the Schmidt type equipped with a focusing apparatus constructed in accordance with the invention.

Referring now to the drawings in which like characters of reference designate similar parts in the various views, 10 designates a camera of the Schmidt type or similar reflecting type, having a reflecting mirror 11 at the back for reflecting the image to a holder for cut film or a plate intermediate the front and rear of the camera and hereafter referred to as a plate holding box.

In carrying out the invention a focusing ring 12 is mounted in an annular slot formed in the body of the camera near the front end of the camera and is threadedly engaged with a pair of diametrically opposed rectilinear slides 13 which are disposed on respective guides 14 secured to the inner wall of the camera. The focusing ring is marked with graduations 15 and a pointer 16 is marked in the body of the camera, see Figure 1.

Figure 2:
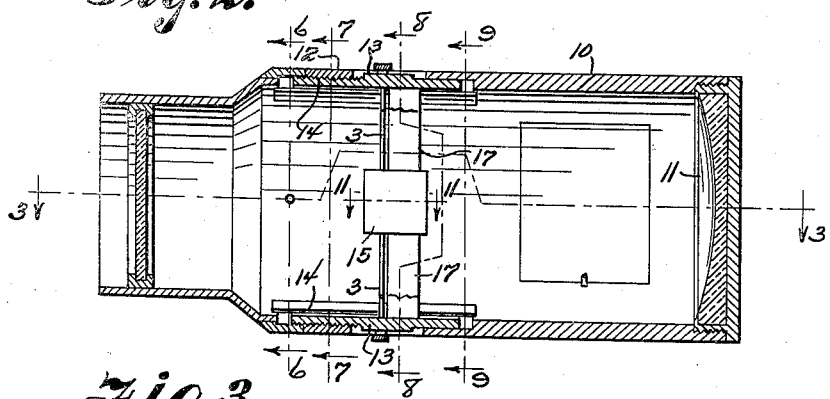
Figure 2 is a longitudinal sectional view taken on the line 2—2 of Figure 1 showing the threaded focusing ring, slides moved by the ring, and box plate holder carried by the slides.
Figure 3:
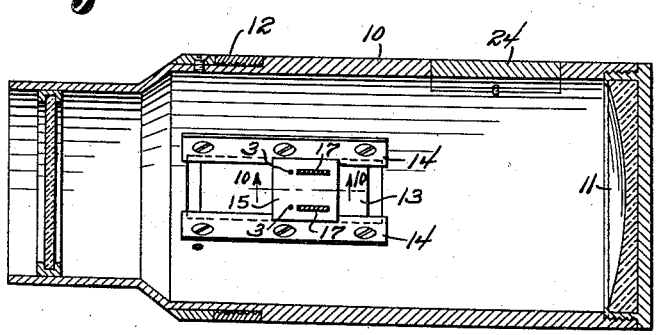
Figure 3 is a longitudinal sectional view taken on the line 3—3 of Figure 2 showing the guides and supports for the box plate holder.
Figure 4:
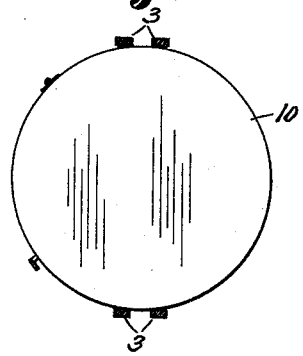
Figure 4 is a rear elevation of the camera shown in Figure 1.
Figure 5:
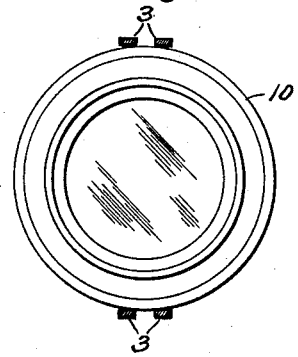
Figure 5 is a front elevation of the camera shown in Figure 1.
Figure 6:
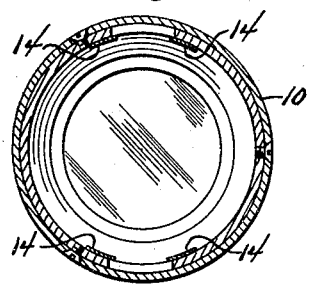
Figure 6 is a cross sectional view taken on the line 6—6 of Figure 2 showing the guides.
Figure 7:
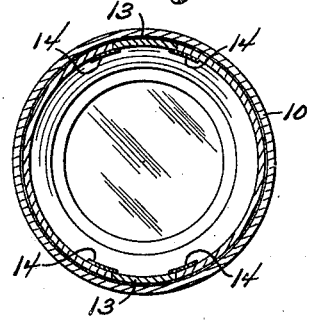
Figure 7 is a cross sectional view taken on the line 7—7 of Figure 6 showing the slides, the guides and the focusing threadedly engaged ring.
Figure 8:
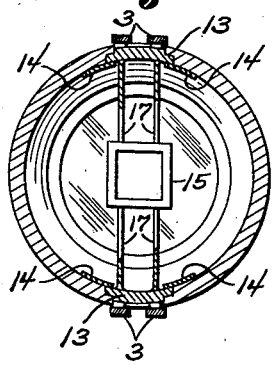
Figure 8 is a cross sectional view taken on the line 8—8 of Figure 2 showing the guides, supports, and the box film holder carried by the supports.
Figure 9:
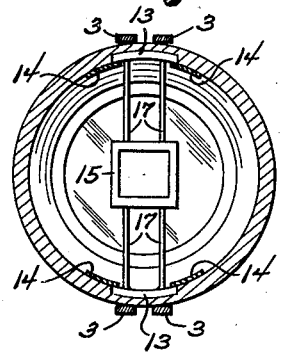
Figure 9 is a cross sectional view taken on the line 9—9 of Figure 2 showing the slides in rear elevation.

In the form of the invention shown in Figures 1 to 11 inclusive a plate holding box 15 is disposed on the axis of the camera and is secured to the slides 13 by supports 17, which may be formed of thin flat bars, see Figure 3. By turning the focusing ring 12 the slides are moved endwise in the camera and carry with them the box 15 which latter is shown in detail in Figures 10 and 11.

The box 15 includes a holder 18 for cut film or a plate 19 and also includes rollers 20 for a shutter curtain 21 of the type having slits of various sizes which are interchangeably disposed in front of the plate in accordance with variations of light, as is well known. The shutter curtain is wound on take up and pay off rollers 22 and is guided over rollers 23 to dispose the shutter curtain in front of the plate, see Figures 10 and 11. However any one of the various types of focal plane shutter, such as the one with a single curtain, or the one with two curtains and an adjustable slit, or other type, may be used in the two constructions herein described, that is with plates or roll film.

For inserting and removing plates a door 24 is formed in the body of the camera, see Figures 1 to 3 inclusive.

It will be pointed out that the shutter is manipulated by control rods 3 which extend from the box through the slides to the outside of the camera, these control rods being disposed in line with the supports.

As shown in Figures 12 to 15 inclusive the box 25 is adapted to support the shutter apron as previously described, and hereinafter more fully described, but is modified to hold roll films as will now be described.

The box 25 is provided with a pair of inclined film rollers 26 over which the film 27 is trained for delivery to a film holding roller 28, see Figure 12, which is disposed in rear of light shields 2 and a guide 29 for the shutter curtain 30 of the type previously described, in the present embodiment two curtains being shown carried by respective rollers 31 to promote greater variation of adjustment to light conditions.

The film 27 is directed through a channel 32 formed in one of the aforesaid supports 33 which are attached to the box and to a slide 34 which is mounted in a slot 35 formed in the body 36 of the camera, see Figure 14.

A magazine 37 for take up and supply film rolls 38, is secured to the slide 34 and is disposed exteriorly of the body of the camera so as to be readily accessible for supplying and removing the film rolls. The film is trained over guide rollers 39 in the magazine to enter the channel 32 of the support 33 accurately. The slide as heretofore described is movable endwise upon guides 40 disposed upon the inner surface of the camera body. Access to the film box to facilitate threading of the roll film through the box may be provided in any preferred manner.

As shown in Figure 15, the Wright camera has the correction lens 41 placed nearly in the focal plane and an opening is made in the lens to receive the film box. In the Schmidt type camera, where roll film is used, the focal plane is midway between the correcting lens and the mirror and no opening is necessary in the correcting lens.

In both forms of the invention a focusing ring is employed, threadedly engaged with diametrically opposite slides to move the slides endwise, the slides being connected to radially disposed supports which are connected to a box at the axis of the camera for holding either plates or rolled film in addition to a shutter apron and supporting rollers therefore.

From the above description it is thought that the construction and operation of the invention will be fully understood without further explanation.

What is claimed is:

1. The combination with a camera having a spherical reflecting mirror at the back, of a sensitized photographic means holder intermediate the front and rear of the camera adapted to be moved on axis of the camera forwardly and rearwardly relatively to the mirror for focusing, a focusing ring rotatably mounted on the camera, a pair of diametrically disposed slides on the camera, a threaded connection between the rings and the slides for moving the slides endwise when the ring is turned axially, supports connecting the slides to the holder for movement as a unit with the slides, and shutter curtain means interposed between the holder and mirror.

2. The structure as of claim 1 and in which the holder is adapted to hold photographic plates, and which the camera is provided with a door to afford access to the holder for removal and replacement of the plates.

3. The structure as of claim 1 and in which the holder is provided with guides for supporting a ribbon of sensitized film, said holder having an extension on the exterior of the camera, take up and supply rolls for rolled film in said extension, and guide rollers in the holder for guiding the film from said rollers to exposure position in the holder.

4. The structure as of claim 1 and in which said focusing ring is provided with graduations and in which the camera is provided with an arrow coacting with the graduations.

LYLE T. JOHNSON.
RAYMOND A. JENSEN.